G. C. DEAKINS, AND H. A. HARKER.
OVERSHOT.
APPLICATION FILED SEPT. 22, 1919.
1,336,684.
Patented Apr. 13, 1920.
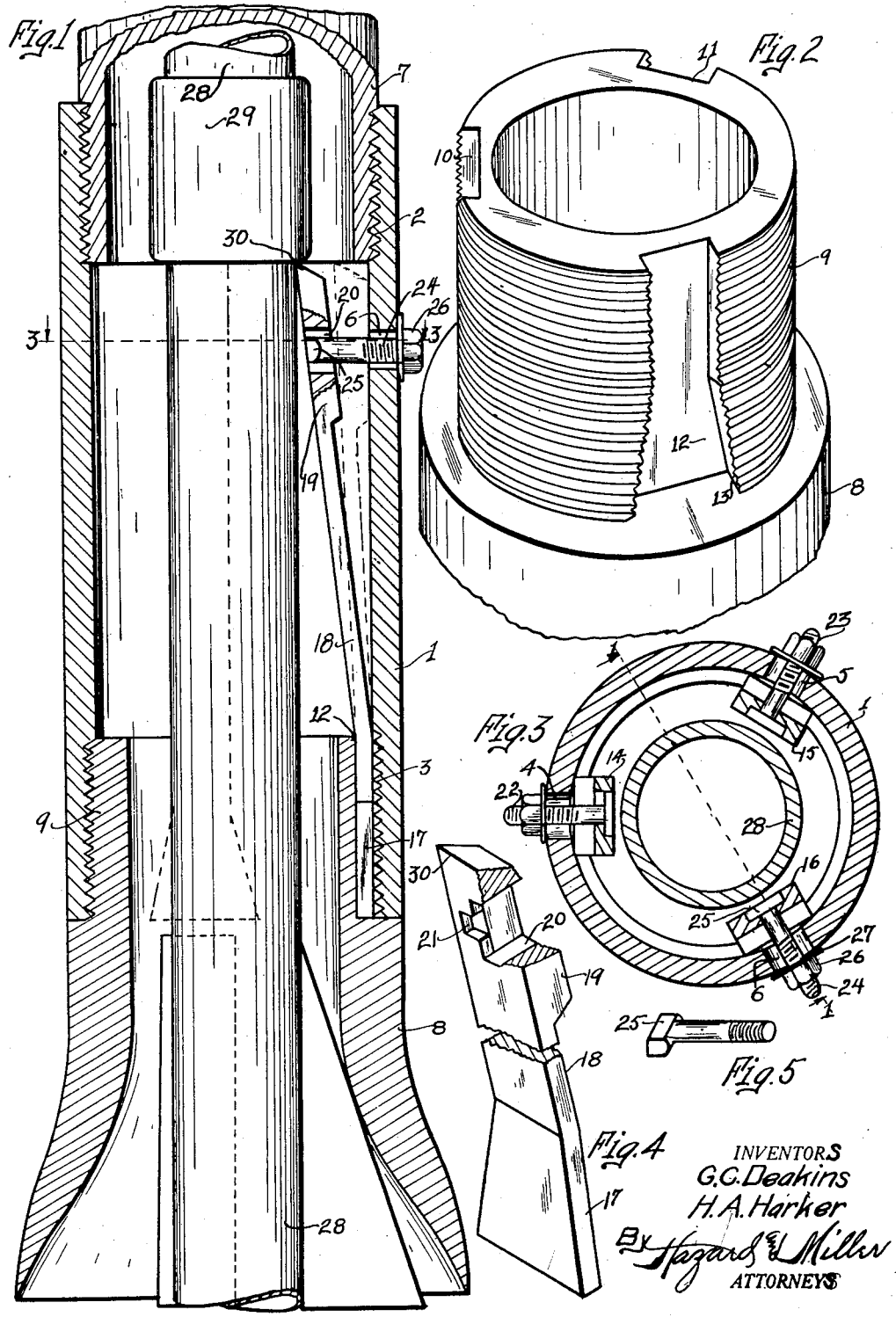
INVENTORS
G.C. Deakins
H.A. Harker
By Hazard & Miller
ATTORNEYS

UNITED STATES PATENT OFFICE.

GROVER CLEVELAND DEAKINS, OF ANAHEIM, AND HARRY ABRAM HARKER, OF FULLERTON, CALIFORNIA, ASSIGNORS OF ONE-THIRD TO WILLIAM TREAT ALLING, OF ANAHEIM, CALIFORNIA.

OVERSHOT.

1,336,684.   Specification of Letters Patent.   Patented Apr. 13, 1920.

Application filed September 22, 1919. Serial No. 325,589.

*To all whom it may concern:*

Be it known that we, GROVER CLEVELAND DEAKINS and HARRY ABRAM HARKER, citizens of the United States, residing at Anaheim and at Fullerton, respectively, in the county of Orange and State of California, have invented new and useful Improvements in Overshots, of which the following is a specification.

Our object is to make an improved overshot, and our invention consists of the novel features herein shown, described and claimed.

Figure 1 is a diametrical vertical sectional detail of an overshot embodying the principles of our invention in use, the operating stem being broken away and the view being taken on the line 1—1 of Fig. 3, and looking in the direction indicated by the arrow.

Fig. 2 is an enlarged fragmentary perspective of the fishing bell and drawn for the purpose of showing the screw-threaded nipple recessed to form seats for the spring grappling members.

Fig. 3 is a horizontal sectional detail on the line 3—3 of Fig. 1 and looking downwardly as indicated by the arrows.

Fig. 4 is a fragmentary perspective of one of the spring grappling members.

The overshot body 1 is a hollow cylinder having an internal screw-thread 2 at its upper end and an internal screw-thread 3 at its lower end and having radially arranged horizontal openings 4, 5 and 6 near its upper end. The operating stem 7 is screwed into the thread 2 and the fishing bell 8 is screwed into the thread 3. The fishing bell 8 has an externally screw-threaded nipple 9 provided with radial recesses 10, 11 and 12. The recesses 10, 11 and 12 are vertical or longitudinal of the nipple 9 and the lower ends 13 of the recesses are enlarged.

Spring grappling members 14, 15 and 16 are mounted with their lower ends in the recesses 10, 11 and 12 and have enlarged lower ends 17 fitting in the enlargements 13 of the recesses so as to hold the spring grappling members from moving upwardly. The recesses 10, 11 and 12 are deep enough so that the thread 3 will pass outside of the spring grappling members.

Each spring grappling member consists of the enlarged lower end 17, a straight spring shank 18 extending from the end 17, and a grappling head 19 at the upper end of the shank 18. The vertically elongated opening 20 is formed through the head 19 and a horizontally elongated recess 21 is formed in the inner face of the head crosswise of the opening 20. The bolts 22, 23 and 24 have heads 25 fitting in the recesses 21 and the bolts extend through the recesses 20 and through the openings 4, 5 and 6, and nuts 26 are placed upon the outer ends of the bolts against washers 27, and the washers 27 fit against the periphery of the body 1 and cover the openings 4, 5 and 6 so as to allow the bolts to work freely through the openings.

When the nuts 26 are loosened the heads 19 will move inwardly to the extent of the lengths of the bolts 22, 23 and 24 and the overshot is ready for use. When the stem 7 is operated to move the overshot down into a well to fish for a broken pipe, drill stem, sucker rod, or the like, the fishing bell 8 will guide the pipe 28 into a central position and the pipe will pass upwardly through the fishing bell 8 and upwardly between the spring grappling members 14, 15 and 16 and press the heads 19 apart until the coupling member 29 has been passed by the heads 19, then the tensions of the shanks 18 will press the heads 19 inwardly until the edges 30 engage the pipe 28 below the coupling member 29, then if the stem 7 is pulled upwardly the pipe 28 will be pulled upwardly, and when desired the nuts 26 may be tightened to pull the heads 19 outwardly and allow the coupling 29 to pass.

Various changes may be made without departing from the spirit of our invention as claimed.

We claim:

1. An overshot comprising a hollow cylindrical body having an internal screw-thread at its upper end and an internal screw-thread at its lower end and radial openings near its upper end; a fishing bell having an external screw-thread fitting the lower internal screw-thread and having radial recesses extending vertically, said recesses having enlarged lower ends; spring grappling members having enlarged lower ends fitting in the recesses and spring shanks extending upwardly and forwardly and grappling heads at their upper ends;

bolts connected to the grappling heads and extending through the openings in the cylindrical body; and nuts upon the outer ends of the bolts.

2. An overshot comprising a hollow cylindrical body, a fishing bell connected to the lower end of the hollow cylindrical body, spring grappling members mounted in the hollow cylindrical body, and bolts connected to the spring grappling members and adapted to pull the spring grappling members outwardly.

In testimony whereof we have signed our names to this specification.

GROVER CLEVELAND DEAKINS.
HARRY ABRAM HARKER.